(12) United States Patent
Takashina et al.

(10) Patent No.: US 10,975,930 B2
(45) Date of Patent: Apr. 13, 2021

(54) METHOD FOR FILLING LIQUID INTO LIQUID-FILLED RUBBER AND DEAERATOR FOR LIQUID

(71) Applicant: TOYO TIRE & RUBBER CO., LTD., Itami (JP)

(72) Inventors: Akio Takashina, Itami (JP); Yuichi Kato, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 325 days.

(21) Appl. No.: 16/207,495

(22) Filed: Dec. 3, 2018

(65) Prior Publication Data

US 2019/0195311 A1    Jun. 27, 2019

(30) Foreign Application Priority Data

Dec. 22, 2017   (JP) .............................. JP2017-246898

(51) Int. Cl.
| | |
|---|---|
| *F16F 13/10* | (2006.01) |
| *B01D 19/00* | (2006.01) |
| *B60K 5/12* | (2006.01) |
| *B29D 22/00* | (2006.01) |
| *B29K 21/00* | (2006.01) |

(52) U.S. Cl.
CPC ........ *F16F 13/103* (2013.01); *B01D 19/0047* (2013.01); *B01D 19/0052* (2013.01); *B29D 22/00* (2013.01); *B60K 5/1208* (2013.01); *B29K 2021/00* (2013.01); *F16F 2226/04* (2013.01); *F16F 2230/06* (2013.01)

(58) Field of Classification Search
CPC ..... F16F 2230/06; F16F 13/10; F16F 2226/04
See application file for complete search history.

(56) References Cited

U.S. PATENT DOCUMENTS

| | | | | |
|---|---|---|---|---|
| 3,945,411 | A * | 3/1976 | Skoli ...................... | B67C 3/001 141/91 |
| 6,299,148 | B1 * | 10/2001 | Miyamoto ............ | F16F 1/3842 267/140.12 |
| 2004/0142017 | A1 * | 7/2004 | Luebbers ................ | A23L 33/18 424/439 |
| 2010/0187734 | A1 * | 7/2010 | Xu ........................ | F16F 13/103 267/140.13 |
| 2014/0246821 | A1 * | 9/2014 | Koga .................... | F16F 13/107 267/140.13 |

FOREIGN PATENT DOCUMENTS

JP        2004-286068 A      10/2004

* cited by examiner

*Primary Examiner* — Scott W Dodds
(74) *Attorney, Agent, or Firm* — Westerman, Hattori, Daniels & Adrian, LLP

(57) ABSTRACT

A method for filling a liquid into a liquid-filled rubber, the method includes a deaerating step of deaerating a liquid under normal temperature, a cooling step of cooling the deaerated liquid, a pouring step of pouring the cooled liquid into a liquid chamber of a rubber member and a sealing step of sealing the liquid chamber in an atmosphere under reduced pressure to seal the liquid in the liquid chamber.

7 Claims, 3 Drawing Sheets

METHOD FOR FILLING LIQUID INTO LIQUID-FILLED RUBBER AND DEAERATOR FOR LIQUID

CROSS-REFERENCE TO RELATED APPLICATIONS

This application claims priority of Japanese Patent Application No. 2017-246898 filed on Dec. 22, 2017, the content of which is incorporated herein by reference.

BACKGROUND OF THE INVENTION

Technical Field

The present invention relates to a method for filling a liquid into a liquid-filled rubber and a deaerator for a liquid.

Related Art

Power train-related units such as an engine, a transmission, and the like are elastically mounted to a vehicle with mount rubbers interposed therebetween, so that the mount rubbers reduce vibration transmission from the power train-related units to a vehicle body. To further reduce vibration transmission with mount rubbers, there is known a liquid-filled rubber (also referred to as a liquid-sealed mount rubber) that is provided in its inside with a liquid chamber filled with a liquid.

The liquid-filled rubber enables improvement in vibration damping performance by using a flow of the liquid filled in the liquid chamber, the flow occurring when the liquid chamber is deformed. Thus, when gas such as air remains in the liquid chamber (referred to as residual air), the residual air is deformed (compressed) when the liquid chamber is deformed in the liquid-filled rubber. This may cause the liquid less likely to flow. As a result, the improvement in vibration damping performance with the liquid-filled rubber becomes insufficient.

For this reason, to prevent gas such as air from remaining in the liquid chamber, the liquid-filled rubber is manufactured by not only previously removing air dissolved in the liquid by deaerating the liquid, but also previously removing air in the liquid chamber by using a vacuum pump, before the liquid chamber is filled with the liquid (e.g., refer to Japanese Patent Laid-Open Publication No. 2004-286068).

In an atmosphere under reduced pressure, a boiling point of a liquid decreases. Thus, when a liquid is particularly poured into a liquid chamber reduced in pressure to a substantially vacuum, the liquid easily boils. This causes the liquid to overflow from the liquid chamber, so that the amount of the liquid in the liquid chamber may be insufficient. In addition, boiling of the liquid may cause residual air in the liquid chamber. That is, from the viewpoint of preventing a boiling of a liquid in an atmosphere under reduced pressure, there is room for further improvement in reduction of residual air in the liquid chamber.

SUMMARY

An object of the present invention is to provide a method for filling a liquid into a liquid-filled rubber and a deaerator for a liquid, each of which is capable of reducing occurrence of residual air in a liquid chamber when the liquid is filled into the liquid chamber in an atmosphere under reduced pressure.

The present invention provides a method for filling a liquid into a liquid-filled rubber, the method including: a deaerating step of deaerating a liquid under normal temperature; a cooling step of cooling the deaerated liquid; a pouring step of pouring the cooled liquid into a liquid chamber of a rubber member; and a sealing step of sealing the liquid chamber in an atmosphere under reduced pressure to seal the liquid in the liquid chamber.

According to the present invention, the liquid is cooled, so that boiling of the liquid in an atmosphere under reduced pressure in the sealing step is suppressed. The liquid is also deaerated under the normal temperature before the cooling step, so that deaerating efficiency can be maintained at a high degree in the deaerating step, thereby enabling gas dissolved into the liquid to be reduced. Thus, inclusion or appearance of the gas is suppressed when the liquid is filled into the liquid chamber in an atmosphere under reduced pressure. As a result, occurrence of residual air in the liquid chamber can be effectively suppressed.

Preferably, the deaerating step is performed multiple times.

According to this configuration, performing the deaerating step multiple times enables increase in a degree of deaeration of a liquid.

Preferably, the method further includes a second deaerating step of further deaerating the cooled liquid.

According to this configuration, performing the second deaerating step enables further increase in a degree of deaeration of a liquid. Performing the second deaerating step between the cooling step and the pouring step can compensate for deterioration in a degree of deaeration that may occur depending on a connection method between the cooling step and the pouring step.

Preferably, the liquid pumped under pressure is supplied in the second deaerating step, and is sprayed in an atmosphere under reduced pressure to be deaerated.

According to this configuration, the liquid is supplied while being pumped under pressure, so that the liquid is under high pressure to be easily sprayed. In addition, the sprayed liquid secures a large surface area, so that most of the liquid can be easily exposed in an atmosphere under reduced pressure, thereby enabling increase in deaerating efficiency.

In the pouring step, the liquid is fed through a cooled pipe.

According to this configuration, a temperature rise of a liquid is suppressed just before the liquid is poured into the rubber member, so that the liquid can be easily maintained at low temperature in the sealing step, thereby further suppressing boiling of the liquid.

The deaerating step is performed by supplying the liquid into a deaeration tank in which pressure inside the deaeration tank is reduced, and in the deaerating step, the liquid is supplied into the deaeration tank by being supplied onto a disk that is provided in an inner upper portion of the deaeration tank in a substantially horizontal manner, and that is rotationally driven.

In the cooling step, the liquid is cooled to a temperature of 0° C. or less.

Another aspect of the present invention provides a deaerator for a liquid that is filled into a liquid-filled rubber, the deaerator including a deaerating unit that deaerates the liquid under normal temperature, and a cooling unit that cools the deaerated liquid.

According to the present invention, since the liquid is cooled, boiling of the liquid can be suppressed when the liquid is sealed in the rubber member in an atmosphere under reduced pressure. The liquid is also deaerated under normal temperature before being cooled, so that deaerating efficiency in the deaerating unit can be maintained at a high degree, thereby enabling gas dissolved into the liquid to be reduced. Thus, filling the deaerated liquid using the present deaerator into the liquid chamber of the rubber member enables occurrence of residual air in the liquid chamber to be efficiently reduced.

According to the present invention, when a liquid is filled into a liquid chamber in an atmosphere under reduced pressure, occurrence of residual air in the liquid chamber can be reduced.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, an embodiment according to the present invention will be described with reference to accompanying drawings. The following description is merely exemplary in nature, and is not intended to limit the invention, its application, or its use. In addition, the drawings are schematic, and ratios of respective dimensions and the like are different from actual ones.

Figure 1:
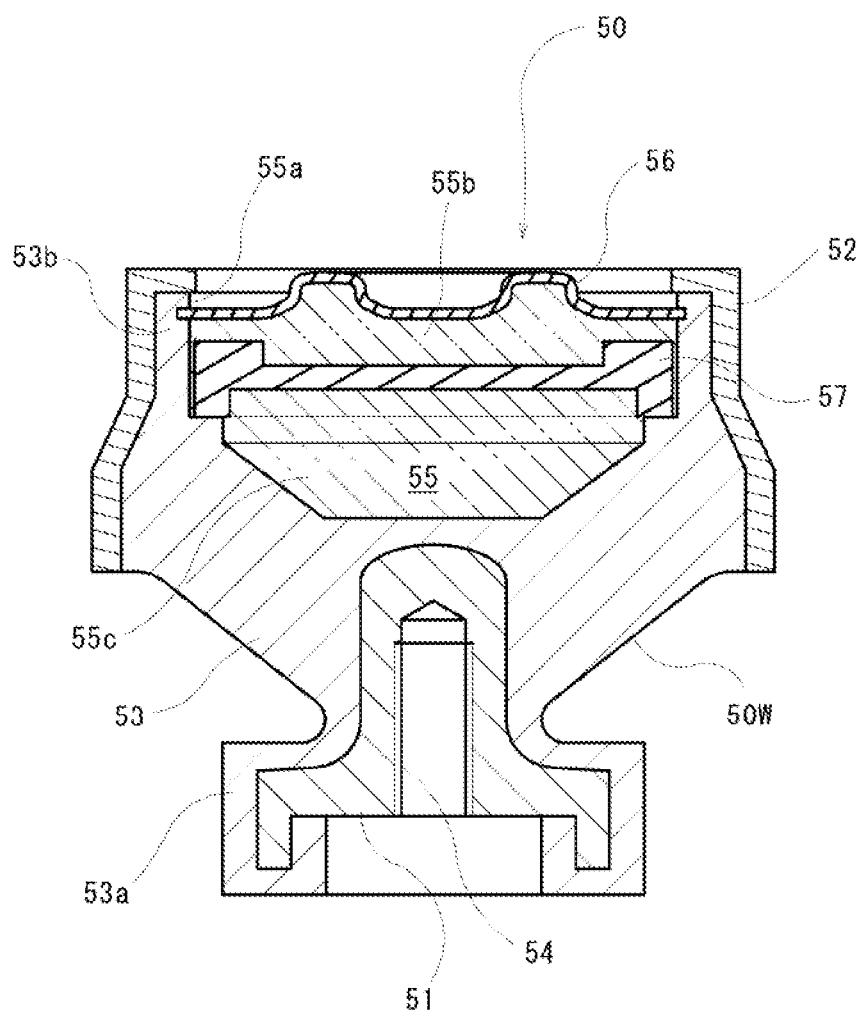
FIG. 1 is a longitudinal sectional view illustrating a liquid-filled engine mount rubber of a vertical type.

FIG. 1 illustrates a liquid-filled rubber 50 of a vertical type (hereinafter referred to as a liquid-sealed mount rubber 50) as an example of a liquid-filled rubber. The liquid-sealed mount rubber 50 is interposed between an engine (not illustrated) and a vehicle body frame to elastically support the engine with respect to the vehicle body frame, and includes a boss fitting 51 attached to the engine, an outer cylindrical metal fitting 52 attached to the vehicle body frame, and an elastic base body 53 made of rubber interposed between the boss fitting 51 and the outer cylindrical metal fitting 52.

The boss fitting 51 is provided with a female screw portion 54 extending vertically, and is configured to be attached to a member on an engine side with a bolt (not illustrated).

The elastic base body 53 is provided in its lower end portion 53a with the boss fitting 51 bonded by vulcanization, and in its upper end portion 53b with the outer cylindrical metal fitting 52 fixed by caulking. The upper end portion 53b has an outer diameter larger than that of the lower end portion 53a, and includes a liquid chamber 55 defined in its inside, opening upward. The liquid chamber 55 is provided at its upper end with an opening 55a in which a diaphragm 56 is provided. The diaphragm 56 is fixed to the opening 55a by caulking with a reinforcing metal fitting (not illustrated) provided on its outer peripheral portion.

The liquid chamber 55 is sealed by a diaphragm 56, and filled with a liquid such as water, ethylene glycol, silicone oil, or the like. The liquid chamber 55 is vertically partitioned into an upper first chamber 55b and a lower second chamber 55c by a partition member 57, and the first chamber 55b and the second chamber 55c communicate with each other through an orifice flow path (not illustrated) formed in the partition member 57. That is, the liquid filled in the liquid chamber 55 can flow from the first chamber 55b to the second chamber 55c or in the opposite direction.

Figure 2:
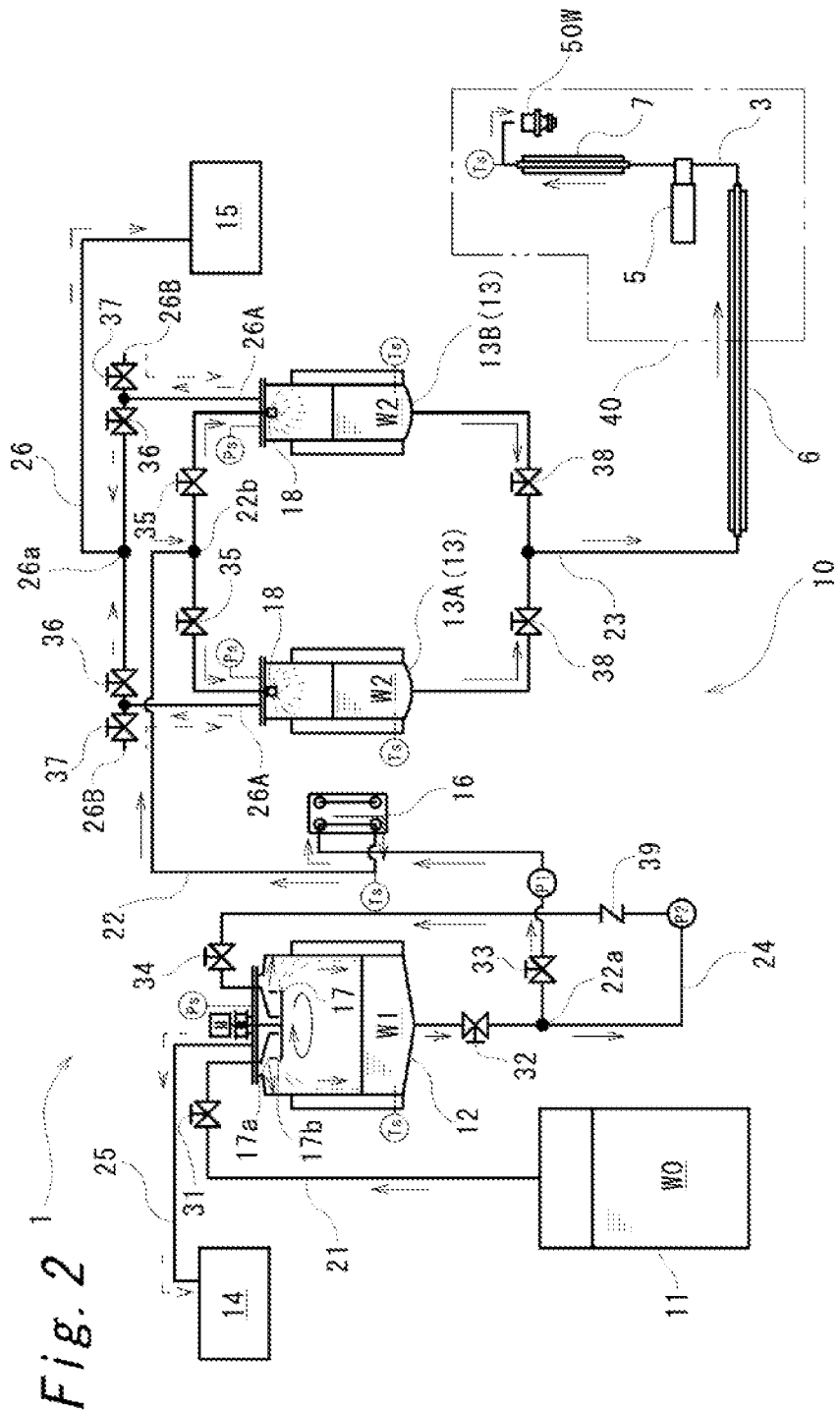
FIG. 2 is an overall configuration view illustrating a liquid filling line to a liquid-filled rubber.

Next, a method for manufacturing the liquid-sealed mount rubber 50 will be described with reference to FIGS. 2 and 3. FIG. 2 schematically illustrates a liquid filling line 1 for filling a liquid into a liquid-sealed mount rubber 50 according to an embodiment of the present invention. FIGS. 3A to 3F schematically illustrate assembly steps of the liquid-sealed mount rubber 50.

First, the liquid filling line 1 will be described with reference to FIG. 2. The liquid filling line 1 includes a deaerator 10 for deaerating a liquid W, an assembling apparatus 40 for assembling the liquid-sealed mount rubber 50, and a supply pipe 3 connecting between the deaerator 10 and the assembling apparatus 40 to serve as a pipe for feeding the liquid W deaerated by the deaerator 10 to the assembling apparatus 40. In FIG. 2, a reference sign Ts indicates a temperature sensor, a reference sign Ps indicates a pressure sensor, solid arrows indicate a flow of the liquid W, and broken arrows indicate a flow of gas such as air.

The deaerator 10 includes a storage tank 11 in which the liquid W before deaeration is stored, a first deaeration tank 12 and a second deaeration tank 13 for deaerating the liquid W as a deaerating unit, a first vacuum pump 14, a second vacuum pump 15, and a heat exchanger 16 as a cooling unit. In the following description, the liquid W will be described separately as a liquid W0 stored in the storage tank 11, a liquid W1 deaerated in the first deaeration tank 12, and a liquid W2 deaerated in the second deaeration tank 13.

The first deaeration tank 12 is connected at its upper portion to a first supply line 21 and a first deaeration line 25. The first deaeration tank 12 is connected to the storage tank 11 via the first supply line 21, and is connected to the first vacuum pump 14 via the first deaeration line 25. The first supply line 21 is provided with a first on-off valve 31 capable of opening and closing a flow path. When a valve opening degree of the first on-off valve 31 is adjusted, a supply flow rate of the liquid W0 to the first deaeration tank 12 is adjusted.

The first deaeration tank 12 is provided in its inner upper portion with a disk 17 in a substantially horizontal manner, the disk 17 being configured to be rotationally driven by a motor M. The disk 17 has a radially inner portion to which the liquid W0 is supplied from the first supply line 21. The disk 17 is provided in its outer peripheral portion with a circumferential wall 17a protruding upward. The circumferential wall 17a is provided in its circumferential direction with a plurality of through holes 17b each radially passing therethrough.

The first deaeration tank 12 is evacuated by the first vacuum pump 14 via the first deaeration line 25 such that its inside is in an atmosphere under reduced pressure (preferably in a vacuum state). The atmosphere under reduced pressure in the first deaeration tank 12 causes the liquid W0 in the storage tank 11 to be sucked into the first deaeration tank 12, so that dissolved gas such as air is removed. As a result, the liquid W1 deaerated in the first deaeration tank 12 can be obtained.

The first deaeration tank 12 is connected at its bottom to the second supply line 22. The first deaeration tank 12 is connected to the second deaeration tank 13 via the second supply line 22. The second supply line 22 is connected to a return line 24 that branches to return to the first deaeration tank 12.

The second supply line 22 is provided with a second on-off valve 32 located upstream of a junction 22a with the return line 24, and a third on-off valve 33, a main pump P1, and the heat exchanger 16, which are located downstream of the junction 22a in this order from the upstream side. Meanwhile, the return line 24 is provided with a return pump P2, a check valve 39, and a fourth on-off valve 34. When the main pump P1 is operated while the second and third on-off valves 32 and 33 are opened and the fourth on-off valve 34 is closed, the deaerated liquid W1 is supplied to the heat exchanger 16 from the first deaeration tank 12.

The heat exchanger 16 uses ethylene glycol as a cooling medium that exchanges heat with the liquid W1 supplied thereto such that a liquid temperature of the liquid W1 is reduced to 0° C. or less. Specifically, the liquid temperature of the liquid W1 is lowered to a temperature range of −20° C. to −5° C., preferably −15° C. to −10° C., whereby a liquid temperature of the liquid W2 to be supplied to the assembling apparatus 40 described below is maintained at 5° C. or less.

The return line 24 is connected at its other end to an upper portion of the first deaeration tank 12, so that the previously deaerated liquid W1 is supplied to the radially inner portion on the disk 17 again via the return line 24. When the return pump P2 is operated while the second and fourth on-off valves 32 and 34 are opened and the third on-off valve 33 is closed, the previously deaerated liquid W1 can be returned to the first deaeration tank 12 via the return line 24. This causes the liquid W1 to be repeatedly deaerated, so that a degree of deaeration of the liquid W1 can be increased.

The second deaeration tank 13 is connected at its upper portion to the second supply line 22 and a second deaeration line 26. The second deaeration tank 13 is connected to the first deaeration tank 12 via the second supply line 22, and is connected to the second vacuum pump 15 via the second deaeration line 26.

In the present embodiment, the second deaeration tank 13 includes two second deaeration tanks 13A and 13B that are provided in parallel. The second supply line 22 is bifurcated at a bifurcated junction 22b located downstream of the heat exchanger 16, and connected to upper portions of the respective second deaeration tanks 13A and 13B. The second supply line 22 is provided with a fifth on-off valve 35 which is located downstream of the bifurcated junction 22b and capable of opening and closing a flow path. When a valve opening degree of the fifth on-off valve 35 is adjusted, a supply flow rate of the liquid W1 to the second deaeration tank 13 is adjusted.

The second supply line 22 is provided at its downstream end with a spray nozzle 18 located inside the second deaeration tank 13. In the spray nozzle 18, a plurality of small holes are drilled, for example, to spray a liquid supplied under predetermined pressure. The liquid W1 pumped under pressure by the main pump P1 is supplied to the spray nozzle 18 via the second supply line 22, so that the liquid W1 is sprayed when passing through the spray nozzle 18 and supplied into the second deaeration tank 13.

The second deaeration line 26 is bifurcated at the bifurcated junction 26a corresponding to the two second deaeration tanks 13A and 13B. The second deaeration line 26 is provided with sixth on-off valve 36 located downstream of the bifurcated junction 26a, and is bifurcated into a deaeration line 26A connected to the second deaeration tank 13 and an atmosphere line 26B opening to the atmosphere, at a place downstream of the sixth on-off valve 36. The atmosphere line 26B is provided with a seventh on-off valve 37.

The second deaeration tank 13 is evacuated by the second vacuum pump 15 via the second deaeration line 26 such that its inside is in an atmosphere under reduced pressure (preferably in a vacuum state). The atmosphere under reduced pressure in the second deaeration tank 13 causes dissolved gas such as air to be removed from the liquid W1 deaerated in the first deaeration tank 12. As a result, the liquid W2 deaerated in the second deaeration tank 13 can be obtained.

The second deaeration tank 13 is connected at its bottom to the third supply line 23. The third supply line 23 is bifurcated corresponding to the two second deaeration tanks 13A and 13B on a second deaeration tank 13 side, and an eighth on-off valve 38 is provided in each bifurcated third supply line 23. The third supply line 23 merges into one path on a downstream side of the eighth on-off valve 38, and is connected to the assembling apparatus 40 via the supply pipe 3 located on the downstream side.

Only one of the second deaeration tanks 13A and 13B is used for supplying the liquid W2. During this period, the other of the second deaeration tanks 13A and 13B may be used for deaerating the liquid W1, or stopped. In other words, since the two second deaeration tanks 13A and 13B are provided, while one of the second deaeration tanks 13A and 13B deaerates the liquid W1 to produce the liquid W2, the other of the second deaeration tanks 13A and 13B can supply the liquid W2 to the assembling apparatus 40. As a result, the deaerator 10 can be efficiently operated.

For example, when the second deaeration tank 13A performs deaeration and the second deaeration tank 13B supplies the liquid W2 to the assembling apparatus 40, the fifth and sixth on-off valves 35 and 36 on a second deaeration tank 13A side are opened and the seventh and eighth on-off valves 37 and 38 are closed. This causes the second deaeration tank 13A to communicate with the second vacuum pump 15 to deaerate the liquid W1 supplied from the second supply line 22. Meanwhile, when the fifth and sixth on-off valves 35 and 36 on the second deaeration tank 13B side are closed and the seventh and eighth on-off valves 37 and 38 are opened, the second deaeration tank 13B can supply the liquid W2.

The supply pipe 3 is provided with a dispenser 5 at some midpoint in its supply path. The dispenser 5 is configured to supply the liquid W2 supplied from the supply pipe 3 to the liquid chamber 55 of a mount work 50W by a predetermined amount. The supply pipe 3 is provided with an upstream double pipe 6 and a downstream double pipe 7, which are formed as a double pipe, on an upstream side and a downstream side across the dispenser 5, respectively. The upstream double pipe 6 and the downstream double pipe 7 each include an outer pipe and an inner pipe between which a cooling medium is supplied. This structure maintains a liquid temperature of the liquid W2 supplied into the supply pipe 3 at low temperature.

Figure 3A:
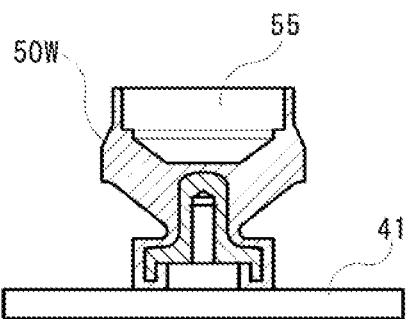
FIGS. 3A to 3F are explanatory views illustrating assembly steps of a liquid-filled rubber.

Next, assembly steps in the assembling apparatus 40 will be described with reference to FIGS. 3A to 3F. As illustrated in FIG. 3A, the mount work 50W is placed on an assembly table 41 in a posture in which the liquid chamber 55 opens upward.

Figure 3D:
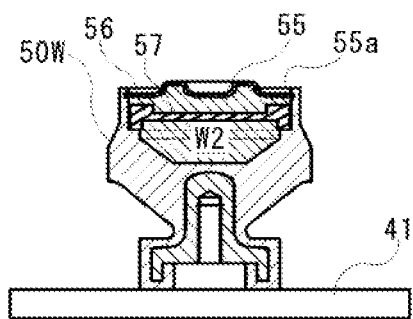
Figure 3B:
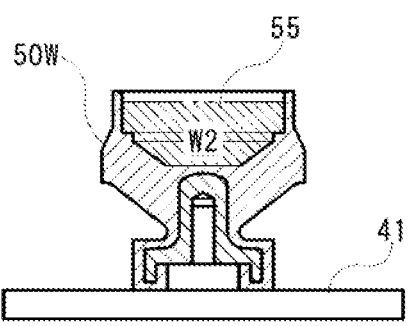

Subsequently, a predetermined amount of the liquid W2 is poured into the liquid chamber 55 through the supply pipe 3, as illustrated in FIG. 3B. Then, after the partition member 57 is assembled into the liquid chamber 55 as illustrated in FIG. 3C, the diaphragm 56 is assembled into the opening 55a of the liquid chamber 55 as illustrated in FIG. 3D. Here, the upper first chamber 55b above the partition member 57 and the lower second chamber 55c below the partition member 57 communicate with each other through an orifice flow path (not illustrated), so that air included in the second chamber 55c when the partition member 57 is assembled is discharged to the outside through the orifice flow path.

Figure 3E:
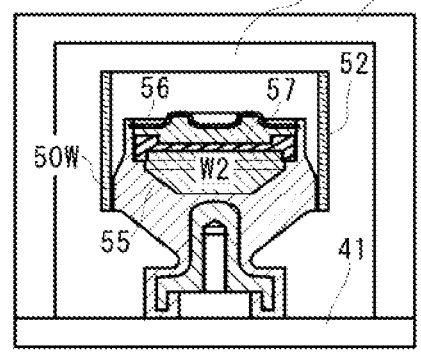
Figure 3C:
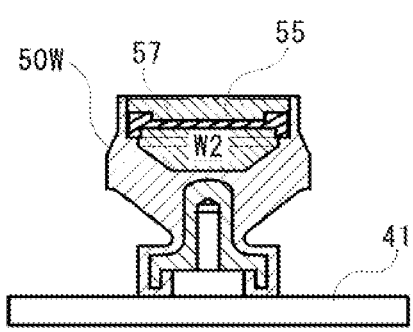

Subsequently, as illustrated in FIG. 3E, the outer cylindrical metal fitting 52 is fitted onto an outer periphery of an upper end portion of the mount work 50W. Then, an enclosing member 42 is mounted on the assembly table 41 from above to enclose the mount work 50W from above and side, so that a sealed chamber 43 is defined by the assembly table 41 and the enclosing member 42.

Figure 3F:
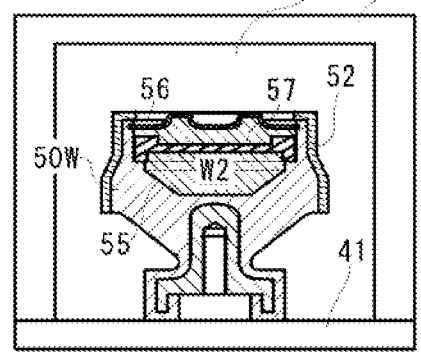

Subsequently, as illustrated in FIG. 3F, the sealed chamber 43 is evacuated by a vacuum pump (not illustrated) to be in an atmosphere under reduced pressure (preferably in a vacuum state). Then, the outer cylindrical metal fitting 52 is caulked radially inward to fix the diaphragm 56 in the opening 55a of the liquid chamber 55, so that the liquid chamber 55 is sealed and filled with only the liquid W2. At this time, the sealed chamber 43 is formed in a vacuum state, so that gas is prevented from entering the liquid chamber 55. Finally, the enclosing member 42 is removed upward to expose the sealed chamber 43 to the atmosphere, and then the liquid-sealed mount rubber 50 is taken out.

Next, the method for manufacturing the liquid-sealed mount rubber 50 will be described. First, the mount work 50W is formed, and then the liquid W0 is deaerated (first deaeration). The deaerated liquid W1 is cooled (cooling step), and the cooled liquid W1 is further deaerated (second deaeration). Then, the liquid W2 further deaerated is quantitatively poured into the liquid chamber 55 of the mount work 50W, and the mount work 50W is assembled to seal the liquid chamber 55, thereby manufacturing the liquid-sealed mount rubber 50.

(Manufacturing Step of Mount Work 50W)

With reference to FIG. 1, the mount work 50W is formed such that the boss fitting 51 and an unvulcanized rubber are set in a vulcanizing mold, and they are molded by vulcanization molding to bond the boss fitting 51 to the lower end portion 53a of the elastic base body 53 by vulcanization.

(First Deaerating Step)

With reference to FIG. 2, the liquid W0 is supplied to the first deaeration tank 12 via the first supply line 21. At this time, the liquid W0 is supplied onto the disk 17 located in the inner upper portion of the first deaeration tank 12. Subsequently, the liquid W0 is moved radially outward on the disk 17, which is rotationally driven by the motor M, by centrifugal force, and is dispersed into the first deaeration tank 12 with a small diameter through the through holes 17b.

Here, the through holes 17b are each formed to have a small diameter, so that the liquid W0 is prevented from dispersing while being lumped. In addition, the disk 17 is rotated at a high speed (e.g., 3,000 rpm), the liquid W0 blown out by the centrifugal force of the disk 17 collides with an inner peripheral wall surface of the first deaeration tank 12 to result in further reduction in diameter.

The liquid W0 colliding with the inner peripheral wall surface of the first deaeration tank 12 drips downward along the inner peripheral wall surface. The first deaeration tank 12 is kept in an atmosphere under pressure reduced by the first vacuum pump 14, so that gas such as air dissolved in the liquid W0 dripping appears in the atmosphere under pressure reduced and is removed, or the liquid W0 becomes the deaerated liquid W1. It is desirable to set the inside of the first deaeration tank 12 to a substantially vacuum state to improve deaerating efficiency.

The liquid W0 is supplied to the first deaeration tank 12 at a normal temperature (e.g., about 25° C.). The first deaeration tank 12 is not particularly temperature-controlled, such as cooling, heating, or the like. The liquid W0 is deaerated in the first deaeration tank 12 at the normal temperature to become the liquid W1. The liquid W1 may be returned to the first deaeration tank 12 via the return line 24 to be further deaerated. This enables degree of deaeration of the liquid W1 to be further increased.

(Cooling Step)

The liquid W1 is pumped under pressure by the main pump P1 to be supplied to the heat exchanger 16 via the second supply line 22, and then is reduced in liquid temperature to 0° C. or less from the normal temperature, preferably to a temperature range of −20° C. or more to −5° C. or less, and more preferably to a temperature range of −15° C. or more to −10° C. or less.

(Second Deaerating Step)

The cooled liquid W1 is supplied to the second deaeration tank 13 via the second supply line 22. The liquid W1 is pumped under pressure to be supplied to the spray nozzle 18 provided at a downstream end of the second supply line 22. Thus, the liquid W1 is supplied into the second deaeration tank 13 while being sprayed by the spray nozzle 18.

The second deaeration tank 13 is kept in an atmosphere under pressure reduced by the second vacuum pump 15, so that gas such as air dissolved in the liquid W1 appears in the atmosphere under reduced pressure and is removed, that is, the liquid W1 becomes the liquid W2 which has been further deaerated. It is desirable to set the inside of the second deaeration tank 13 to a substantially vacuum state to improve deaerating efficiency.

The liquid W1 is supplied to second deaeration tank 13 from the first deaeration tank 12 via the heat exchanger 16 by being pumped under pressure by the main pump P1. In this case, gas such as air may be entrained in the liquid W1 while the liquid W1 is pumped under pressure by the main pump P1, so that a degree of deaeration of the liquid W1 may be deteriorated. However, in the present embodiment, since the second deaeration tank 13 performs second deaerating to compensate for deterioration of the degree of deaeration of the liquid W1, a cooled liquid W2 having an increased degree of deaeration can be obtained.

(Pouring Step)

The cooled liquid W2 having an increased degree of deaeration is supplied to the assembling apparatus 40 through the supply pipe 3. The supply pipe 3 is provided with the dispenser 5, so that the dispenser 5 quantitatively supplies the liquid W2 to the liquid chamber 55 of the mount work 50W. At this time, the supply pipe 3 includes the upstream double pipe 6 and the downstream double pipe 7 on its both respective sides across the dispenser 5. The cooling medium is supplied to each of the upstream double pipe 6 and the downstream double pipe 7, so that a liquid temperature of the liquid W2 supplied through the supply pipe 3 is maintained at a low temperature of 5° C. or less, for example.

(Sealing Step)

After the liquid W2 is quantitatively supplied to the liquid chamber 55, the mount work 50W is assembled with the partition member 57, the diaphragm 56, and the outer cylindrical metal fitting 52, and the outer cylindrical metal fitting 52 is caulked in the evacuated sealed chamber 43.

Here, the liquid W2 is maintained at low temperature because it is cooled to 0° C. or lower in the cooling step, and is further supplied to the liquid chamber 55 of the mount work 50W via the upstream and downstream double pipes 6 and 7 that are cooled. Specifically, the liquid W2 is maintained at a low temperature of 5° C. or lower, so that its boiling is suppressed even when the sealed chamber 43 is evacuated.

In addition, when the outer cylindrical metal fitting 52 is caulked to seal the liquid chamber 55 in the evacuated sealed chamber 43, the liquid chamber 55 can be filled with the liquid W2 while gas such as air is prevented from being entrained. As a result, the liquid-sealed mount rubber 50 is manufactured such that the liquid chamber 55 is filled with the liquid W2 while inclusion of gas such as air is suppressed.

According to the method for filling a liquid into a liquid-filled rubber and a deaerator for liquid, configured as described above, the following effects can be obtained.

(1) The liquid W2 that is cooled and maintained at a low temperature is supplied to the assembling apparatus 40, so that boiling of the liquid W2 in the sealed chamber 43 that is reduced in pressure in the sealing step is suppressed. The liquid W2 is also deaerated at normal temperature in the first deaerating step before the cooling step, so that deaerating efficiency can be maintained at a high degree in the first deaerating step. This enables reduction of gas dissolved in the liquid W1. Thus, when the liquid chamber 55 of the mount work 50W is filled with the liquid W2 in the sealed chamber 43 reduced in pressure, inclusion or appearance of gas is suppressed. As a result, occurrence of residual air in the liquid chamber 55 can be effectively suppressed.

(2) Performing the first deaerating step multiple times enables increase in a degree of deaeration of the liquid W1.

(3) Performing the second deaerating step in addition to the first deaerating step enables further increase in a degree of deaeration of the liquid W2. In addition, performing the second deaerating step between the cooling step and the pouring step can compensate for deterioration in a degree of deaeration due to a connection method between the cooling step and the pouring step, or entrainment of air that may occur when the liquid W1 is pumped under pressure by the main pump P1.

(4) The liquid W1 is supplied to the second deaeration tank 13 while being pumped under pressure, so that the liquid pressure is high to cause the liquid W1 to be easily sprayed by the spray nozzle 18. In addition, the sprayed liquid W2 secures a large surface area, so that most of the liquid W2 can be easily exposed in an atmosphere under reduced pressure, thereby enabling increase in deaerating efficiency.

(5) The liquid W2 is maintained at low temperature by the upstream double pipe 6 of the supply pipe 3 and the downstream double pipe 7 thereof, so that a temperature rise of the liquid W2 is suppressed just before the liquid W2 is poured into the liquid chamber 55 of the mount work 50W. As a result, the liquid W2 can be easily maintained at a low temperature in the sealing step, so that boiling of the liquid W2 can be further suppressed in the sealed chamber 43 reduced in pressure.

In the above embodiment, while the first deaerating step is followed by the second deaerating step as the deaerating step, only the first deaerating step may be performed. Even in this case, the cooling step may be performed after the first deaerating step. In the above embodiment, while the method for manufacturing the liquid-sealed mount rubber 50 is described as an example, the present invention is not limited thereto. The present invention can be suitably practiced as long as it is a rubber member having a liquid chamber filled with a liquid.

What is claimed is:

1. A method for filling a liquid into a liquid-filled rubber, the method comprising:
    a deaerating step of deaerating the liquid under normal temperature;
    a cooling step of cooling the deaerated liquid;
    a pouring step of pouring the cooled liquid into a liquid chamber of a rubber member; and
    a sealing step of sealing the liquid chamber in an atmosphere under reduced pressure to seal the liquid in the liquid chamber and form the liquid-filled rubber.

2. The method for filling the liquid into the liquid-filled rubber according to claim 1, wherein the deaerating step is performed multiple times.

3. The method for filling the liquid into the liquid-filled rubber according to claim 1, further comprising a second deaerating step of further deaerating the cooled liquid.

4. The method for filling the liquid into the liquid-filled rubber according to claim 3, wherein the liquid is pumped under pressure in the second deaerating step, and is sprayed in an atmosphere under reduced pressure to be deaerated.

5. The method for filling method for filling the liquid into the liquid-filled rubber according to claim 1, wherein the liquid is fed through a cooled pipe.

6. The method for filling the liquid into the liquid-filled rubber according to claim 1, wherein
    the deaerating step is performed by supplying the liquid into a deaeration tank in which pressure inside the deaeration tank is reduced, and
    in the deaerating step, the liquid is supplied into the deaeration tank by being supplied onto a disk that is provided in an inner upper portion of the deaeration tank in a substantially horizontal manner, and that is rotationally driven.

7. The method for filling the liquid into the liquid-filled rubber according to claim 1, wherein in the cooling step, the liquid is cooled to a temperature of 0° C. or less.

* * * * *